(12) United States Patent
Roitman et al.

(10) Patent No.: US 11,561,981 B2
(45) Date of Patent: Jan. 24, 2023

(54) GLOBAL INDEXING TECHNIQUES FOR ACCELERATING DATABASE FUNCTIONS

(71) Applicant: Sisense Ltd., Ramat Gan (IL)

(72) Inventors: Shai Roitman, Tel Aviv (IL); Eldad Farkash, Tel Aviv (IL)

(73) Assignee: Sisense Ltd., Ramat Gan (IL)

(*) Notice: Subject to any disclaimer, the term of this patent is extended or adjusted under 35 U.S.C. 154(b) by 171 days.

(21) Appl. No.: 16/680,698

(22) Filed: Nov. 12, 2019

(65) Prior Publication Data

US 2020/0151173 A1    May 14, 2020

Related U.S. Application Data

(60) Provisional application No. 62/758,836, filed on Nov. 12, 2018.

(51) Int. Cl.
*G06F 16/2455* (2019.01)
*G06F 16/22* (2019.01)
*H04L 9/06* (2006.01)

(52) U.S. Cl.
CPC ...... *G06F 16/2456* (2019.01); *G06F 16/2255* (2019.01); *G06F 16/2282* (2019.01); *H04L 9/0643* (2013.01)

(58) Field of Classification Search
CPC ............ G06F 16/2456; G06F 16/2255; G06F 16/2282; H04L 9/0643
See application file for complete search history.

(56) References Cited

PUBLICATIONS

Zhang, Xiaohai. Performance Evaluation of Grace Hash—Join Algorithm on the KSR-1 Multiprocessor System. Diss. University of Florida, 1994. (Year: 1994).*

* cited by examiner

*Primary Examiner* — William B Partridge
*Assistant Examiner* — Erich Alexander Fischer
(74) *Attorney, Agent, or Firm* — M&B IP Analysts, LLC

(57) ABSTRACT

A system and method for accelerating relational functions between tables. The method includes: determining a plurality of first index values for a plurality of first unique keys in a first column of a first table; determining a plurality of second index values for a plurality of second unique keys in a second column of a second table; generating a hashed third table based on the first column of the first table and the plurality of first index values; generating a hashed fourth table based on the second column of the first table and the plurality of first index values; and generating a fifth table by performing a JOIN operation between the third table and the fourth table based on at least one third column, wherein each of third column includes a plurality of third unique keys that are common between the third table and the fourth table.

18 Claims, 5 Drawing Sheets

GLOBAL INDEXING TECHNIQUES FOR ACCELERATING DATABASE FUNCTIONS

CROSS-REFERENCE TO RELATED APPLICATIONS

This application claims the benefit of U.S. Provisional Application No. 62/758,836 filed on Nov. 12, 2018, the contents of which are hereby incorporated by reference.

TECHNICAL FIELD

The disclosure generally relates to relational databases and particularly to accelerating JOIN operations in querying relational databases.

DESCRIPTION OF THE BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section. Similarly, issues identified with respect to one or more approaches should not be assumed to have been recognized in any prior art on the basis of this section, unless otherwise indicated.

In a relational database, JOIN operations combine columns from one table and another, based on common values. In large datasets, this can lead to a high memory utilization, which can increase costs. There is therefore an incentive to provide solutions which would reduce memory utilization and improve upon at least performing such operations as JOIN operations.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "some embodiments" or "certain embodiments" may be used herein to refer to a single embodiment or multiple embodiments of the disclosure.

Certain embodiments disclosed herein include a method for accelerating relational functions between tables. The method comprises determining a plurality of first index values for a plurality of first unique keys in a first column of a first table, wherein each first index value is determined for one of the plurality of first unique keys; determining a plurality of second index values for a plurality of second unique keys in a second column of a second table, wherein each second index value is determined for one of the plurality of unique second keys; generating a hashed third table based on the first column of the first table and the plurality of first index values, wherein each first unique key in the first table is replaced with a corresponding first index value of the plurality of first index values in the third table; generating a hashed fourth table based on the second column of the first table and the plurality of first index values, wherein each second unique key in the second table is replaced with a corresponding second index value of the plurality of second index values in the fourth table; and generating a fifth table by performing a JOIN operation between the third table and the fourth table based on at least one third column, wherein each of the at least one third column includes a plurality of third unique keys, wherein each third unique key is common between the third table and the fourth table.

Certain embodiments disclosed herein also include a non-transitory computer readable medium having stored thereon instructions for causing a processing circuitry to execute a process. The process comprises determining a plurality of first index values for a plurality of first unique keys in a first column of a first table, wherein each first index value is determined for one of the plurality of first unique keys; determining a plurality of second index values for a plurality of second unique keys in a second column of a second table, wherein each second index value is determined for one of the plurality of unique second keys; generating a hashed third table based on the first column of the first table and the plurality of first index values, wherein each first unique key in the first table is replaced with a corresponding first index value of the plurality of first index values in the third table; generating a hashed fourth table based on the second column of the first table and the plurality of first index values, wherein each second unique key in the second table is replaced with a corresponding second index value of the plurality of second index values in the fourth table; and generating a fifth table by performing a JOIN operation between the third table and the fourth table based on at least one third column, wherein each of the at least one third column includes a plurality of third unique keys, wherein each third unique key is common between the third table and the fourth table.

Certain embodiments disclosed herein also include a system for accelerating relational functions between tables. The system comprises a processing circuitry; and a memory, the memory containing instructions that, when executed by the processing circuitry, configure the system to: determine a plurality of first index values for a plurality of first unique keys in a first column of a first table, wherein each first index value is determined for one of the plurality of first unique keys; determine a plurality of second index values for a plurality of second unique keys in a second column of a second table, wherein each second index value is determined for one of the plurality of unique second keys; generate a hashed third table based on the first column of the first table and the plurality of first index values, wherein each first unique key in the first table is replaced with a corresponding first index value of the plurality of first index values in the third table; generate a hashed fourth table based on the second column of the first table and the plurality of first index values, wherein each second unique key in the second table is replaced with a corresponding second index value of the plurality of second index values in the fourth table; and generate a fifth table by performing a JOIN operation between the third table and the fourth table based on at least one third column, wherein each of the at least one third column includes a plurality of third unique keys, wherein each third unique key is common between the third table and the fourth table.

In addition, certain embodiments disclosed herein include a method for accelerating relational functions between tables. The method comprises the steps of determining an index value from a finite series of values for each unique key of a first plurality of unique keys in a first column of a first table; determining an index value from the finite series of values for each unique key of a second plurality of unique keys in a second column of a second table; inserting a hashed column into the first table, wherein the hashed column includes each determined index value in place of its corresponding unique key.

In addition, certain embodiments disclosed herein include a non-transitory computer readable medium having stored thereon instructions for causing a processing circuitry to execute a process. The process comprises the steps of determining an index value from a finite series of values for each unique key of a first plurality of unique keys in a first column of a first table; determining an index value from the finite series of values for each unique key of a second plurality of unique keys in a second column of a second table; inserting a hashed column into the first table, wherein the hashed column includes each determined index value in place of its corresponding unique key.

In addition, certain embodiments disclosed herein include a system for accelerating relational functions between tables. The system comprises a processing circuitry; and a memory, the memory containing instructions that, when executed by the processing circuitry, configure the system to: determine an index value from a finite series of values for each unique key of a first plurality of unique keys in a first column of a first table; determine an index value from the finite series of values for each unique key of a second plurality of unique keys in a second column of a second table; insert a hashed column into the first table, wherein the hashed column includes each determined index value in place of its corresponding unique key.

BRIEF DESCRIPTION OF THE DRAWINGS

The subject matter of the disclosure is particularly pointed out and distinctly claimed in the claims at the conclusion of the specification. The foregoing and other objects, features, and advantages will be apparent from the following detailed description taken in conjunction with the accompanying drawings.

DETAILED DESCRIPTION

Figure 1:
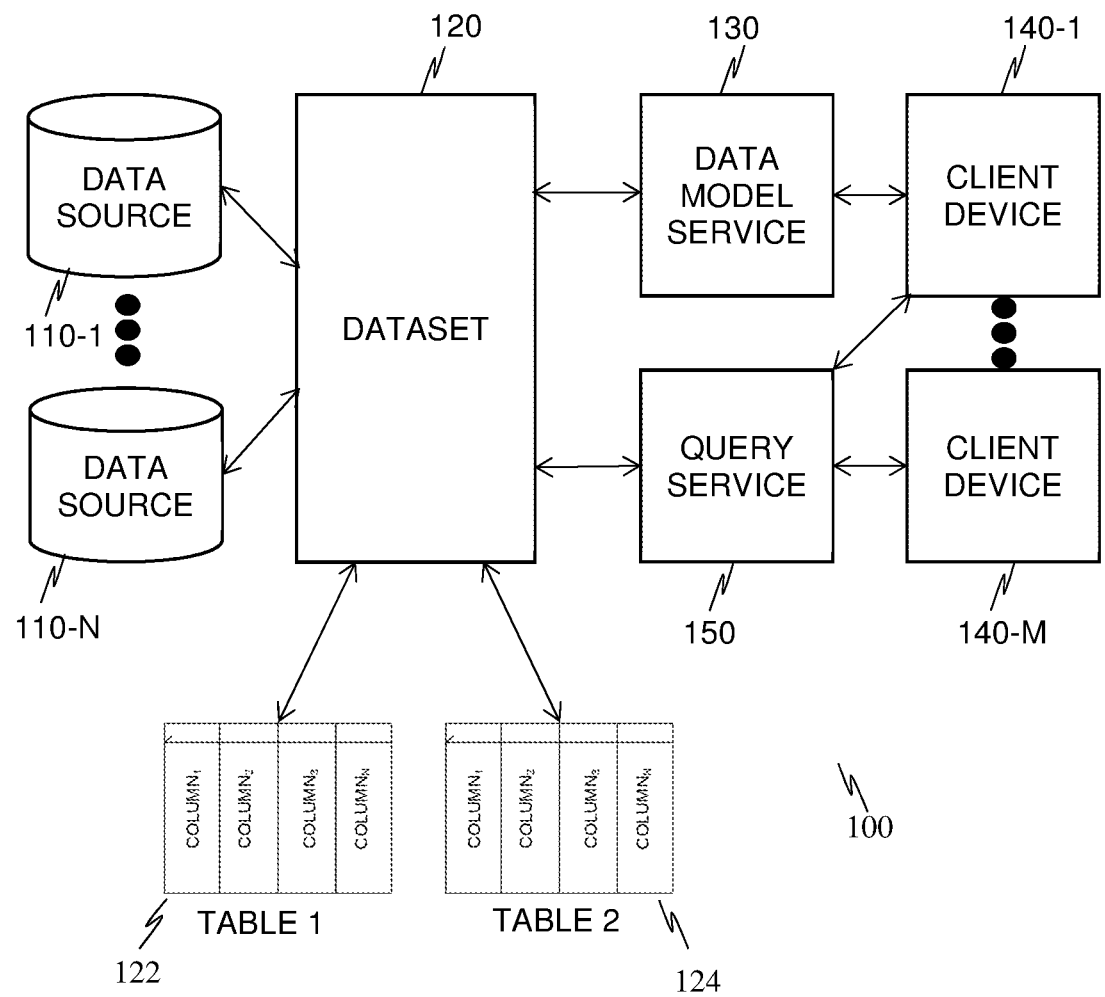
FIG. 1 is a flow diagram utilized to describe a data processing system an embodiment.

It is important to note that the embodiments disclosed herein are only examples of the many advantageous uses of the innovative teachings herein. In general, statements made in the specification of the present application do not necessarily limit any of the various claims. Moreover, some statements may apply to some inventive features but not to others. In general, unless otherwise indicated, singular elements may be in plural and vice versa with no loss of generality. In the drawings, like numerals refer to like parts through several views.

In relational databases, certain operations, such as JOIN operations, are memory intensive because they require data to be stored in memory while a table (the output of the JOIN operation) is being generated. In order to reduce the memory utilization, the disclosed embodiments provide techniques for using a finite space to represent values of the table, thereby allowing control of the amount of memory of used by the system when performing JOIN operations.

FIG. 1 is an example flow diagram 100 utilized to describe a data processing system according to an embodiment. The flow diagram 100 includes a plurality of data sources 110-1 through 110-N, where 'N' is an integer having a value of '2' or more. Each data source may be independent or may be part of a distributed database structure. A data source may be a data lake, a data warehouse, a database (e.g., a structured query language database), etc.

A dataset 120 can be generated based on data from the data sources 110. For example, the dataset 120 may include tables which are JOIN products of two tables, each from a different data source (e.g., data sources 110-1 and 110-2). The dataset 120 may include multiple such tables. In an example implementation, the dataset 120 includes tables where the data is more organized than in the data sources 110. For example, tables in the dataset 120 may be a result of ETL (extract, transform, and load) processes.

In an embodiment, the dataset 120 includes a first table 122 and a second table 124. A data model service 130 may define a relation between one or more columns in one or more tables and may cause generation of a table in the dataset 120 which is the result of such a relation. A plurality of client devices 140-1 through 140-M (where 'M' is an integer having a value of '2' or more) query the dataset 120 through a query service 150. The query service 150 and the data model service 130 may each be implemented on standalone machines, in a cloud-based computing environment, as a single machine, or any combination thereof. In an embodiment, at least the data model service may be realized as the system 500, FIG. 5.

In an embodiment, the query service 150 is configured to check if a client device 140 (or a user account associated with the same) has permission to execute a given query on a certain dataset table (e.g., the table 122 or 124). Some client devices, such as client device 140-1, are further allowed to configure a data model (i.e., defining relationships between table columns).

Figure 2:
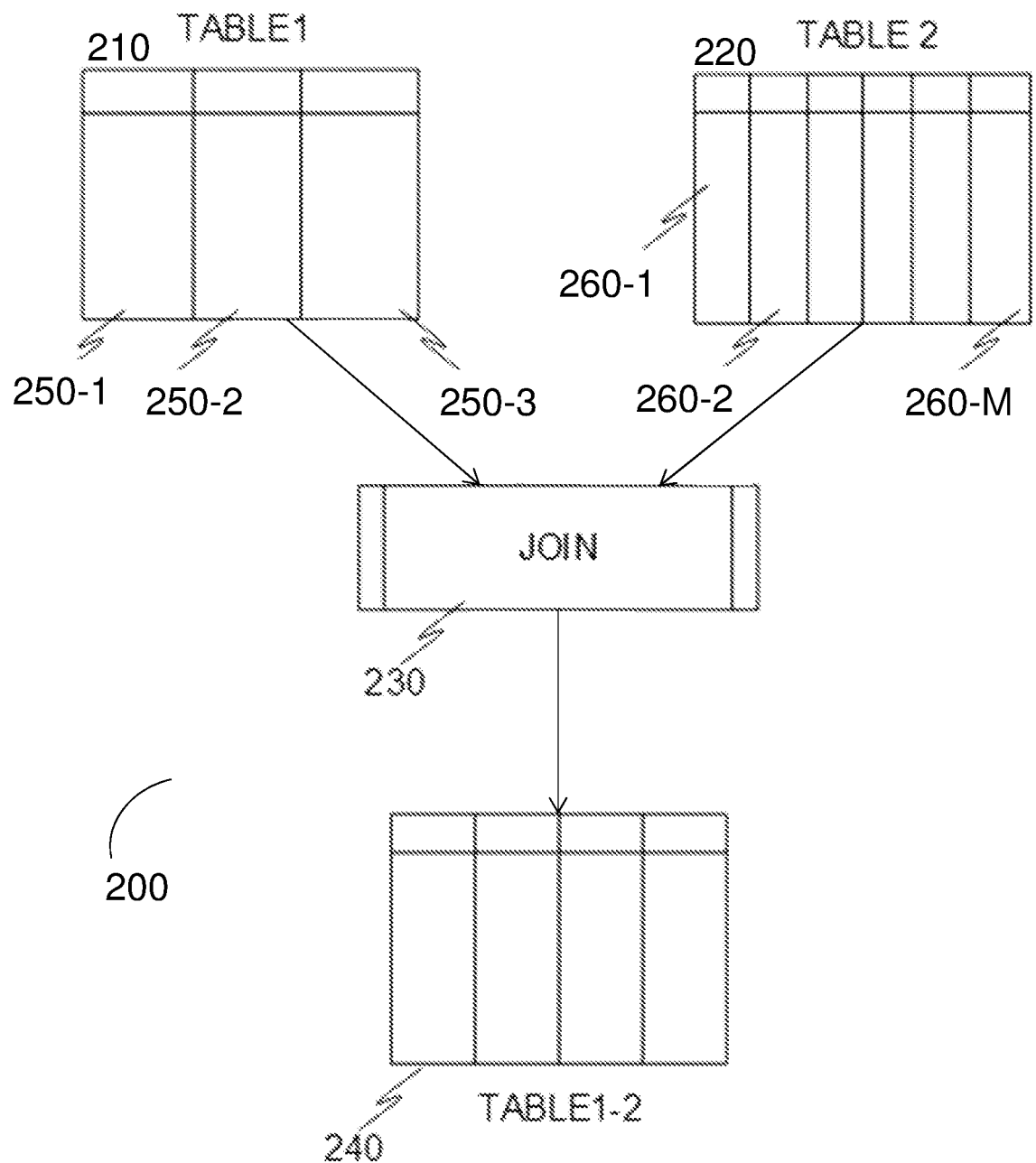
FIG. 2 is a flow diagram illustrating a JOIN operation according to an embodiment.

FIG. 2 is an example flow diagram 200 illustrating a JOIN operation according to an embodiment. A table 210 includes columns 250-1, 250-2 and 250-3. A table 220 includes columns 260-1 through 260-M where M is an integer having a value of '2' or greater. A third column 250-3 of the first table 210 shares a key with the second column 260-2 of the second table 260. In an embodiment, the tables 210 and 220 may be third and fourth hashed tables created as described further herein below with respect to FIG. 3.

A JOIN operation 230 performed based on the keys of the third column 210-3 and the second column 220-2 results in generation of a new table 240. In an embodiment, the new table 240 is generated based on hashed tables such that the new table 240 includes common keys between the hashed tables as described herein.

In this regard, it should be noted that, for large data sets, generating the table 240 according to existing solutions may result in a significant use of computational resources and memory utilization due to having to store all the data in memory while the table 240 is being generated. The table 240 is desirable as it allows for performance of queries which may be of interest to a user of the system, and it is simpler to query a single table than it is to query two tables in two different locations, which may even be accessible through different systems altogether. It has been identified that reducing the computational time and memory usage is desirable as this allows for reduced cost and supplies users with information faster.

Figure 3:
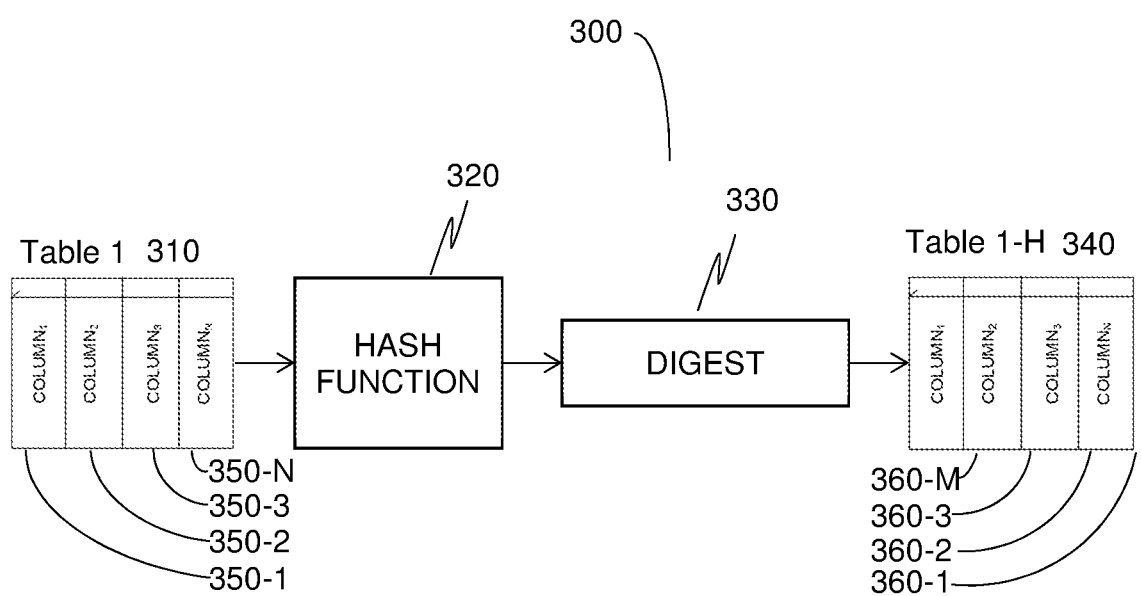
FIG. 3 is a flow diagram utilized to describe a global indexing system for accelerating relational table operations according to an embodiment.

FIG. 3 is flow diagram 300 utilized to describe a global indexing system for accelerating relational table operations according to an embodiment. A table 310 includes a plurality of columns, 350-1 through 350-N. Each column includes a plurality of keys (not shown), which are the unique values of data in that particular column. A key may be an integer, a string, and the like.

Each key is used as an input for a hash function 320, which outputs a digest 330. The hash function 320 maps data of arbitrary size to data of fixed size. For example, a first column may include any integer up to 1012. By only mapping the keys (i.e., unique numbers actually used in the column), that number may drop significantly. For example, if the integer represents age, then it is extremely unlikely to go over 130, so only a small portion of the total available numbers would actually need to be represented by the hash function, with a negligible chance of overlap.

This is also true, for example, for strings such as names. Consider that it would take a large number of bits to directly represent 'Massachusetts.' However, if the keys are names of continental states, then it would only take 48 digests, which can be represented using only 6 bits. The digests are then used to generate a hashed table 340, which includes a plurality of columns 360-1 through 360-M, by replacing the original keys which were used as inputs for the hash function 320 with the corresponding digests.

In an embodiment, one or more of the columns of table 310 may be used as inputs for the hash function. In an embodiment, a first hash function may be used for a first group of tables (or columns, or column types), and a second hash function may be used for a second group of tables (or columns, or columns types).

In a further embodiment, different hash functions may be used for different types of data. As a non-limiting example, columns which include first names and last names may be hashed using a first hash function, and columns which include city names and country names may be hashed using a second hash function. As another non-limiting example, a first hash function may be used for all columns having strings, and another used for columns having integers.

By performing the hash, the memory usage may be reduced from an arbitrary size to a fixed size which is controlled by the user or administrator of the system. Essentially, the size of the digest determines the amount of memory used when performing a JOIN operation. In some embodiments, the disclosed embodiments include balancing between the representation size and the variance of the data. Generally speaking, as the variance increases, a larger representation is needed in order to reduce the risk of overlapping mapping. For example, a 256-bit or 128-bit representation may be large enough for most applications and purposes, but a 64-bit could present problems when dealing with large enough data sets. In some embodiments, the digest size may be determined based on the column (local indexing) or may be static for all data sets (global indexing). This process also allows for faster creation of new relations because the hash function would not change the actual keys. As a result, defining a new relation in the data model service could be computed with less resources and therefore, new relations may be defined more often.

Figure 4:
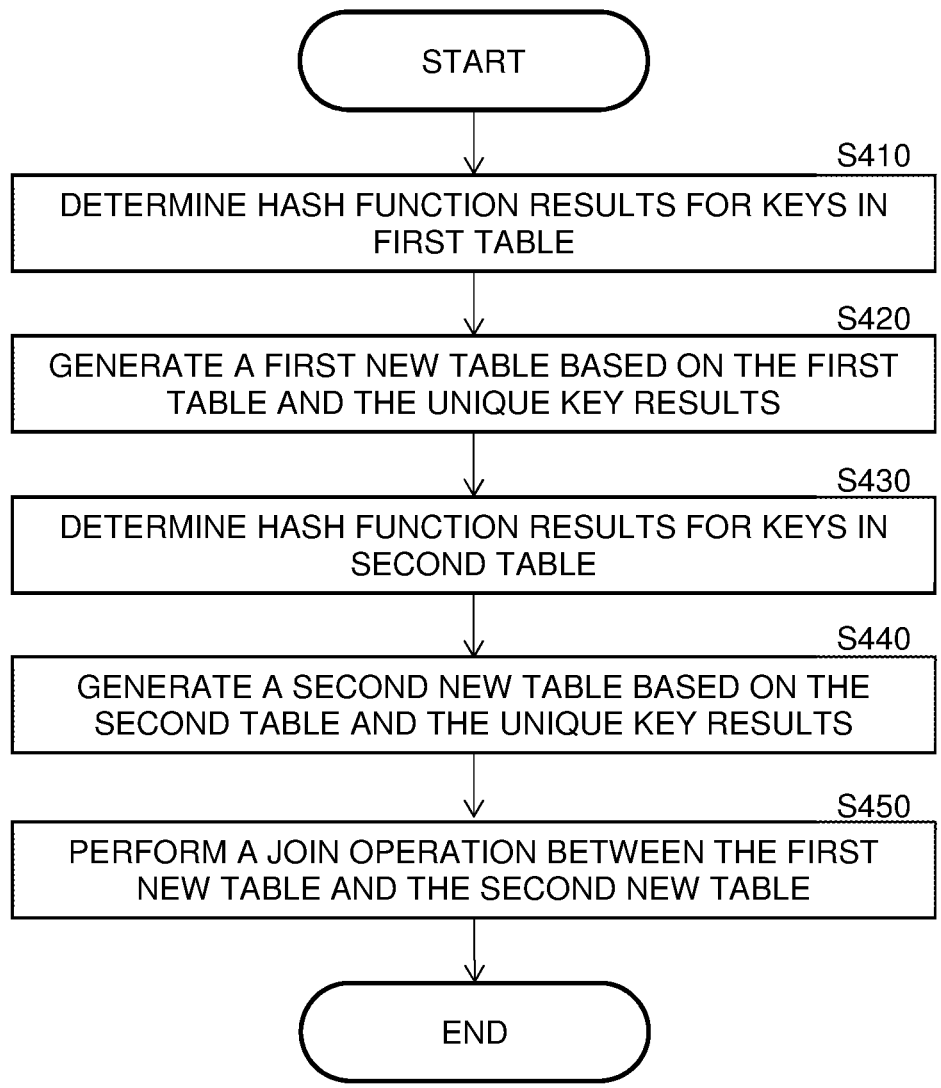
FIG. 4 is a flowchart of a method for using indexing for accelerating relational functions between two or more tables according to an embodiment.

FIG. 4 is an example flowchart of a method for accelerating relational functions between two or more tables according to an embodiment.

At S410, a digest is determined for each unique key in a first column of a first table. Each digest is an index value determined using a hash function which maps data of arbitrary size to data of a fixed size. The hash function is applied to each unique key in order to determine the corresponding digest for that unique key. The digest may be, for example but not limited to, a fixed size alphanumeric string.

At S420, a hashed third table is generated based on the first table and the determined digests. In an embodiment, S420 includes replacing each unique key with its corresponding digest. The hashed third table requires less memory to process, as the hashed key requires less digital representation than the keys of the first table.

At S430, a digest is determined for each unique key in a second column of a second table. At least a portion of the unique keys of the first column of the first table overlap with the unique keys of the second column of the second table. A unique key is unique as compared to other keys, but may occur multiple times within the same column, in multiple columns, or a combination thereof. For example, consider the table:

TABLE 1

| DepartmentName | Manager |
|---|---|
| R&D | Leon |
| Product | Guy |
| Admin | Amir |

Which can be JOINed with:

TABLE 2

| Employee | DepartmentName |
|---|---|
| Daniel | R&D |
| Jonathan | R&D |
| Tom | Product |
| Rinat | Admin |

The key 'R&D' appears in both Table 1 and Table 2, and in table 2 it appears twice. Thus, 'R&D' is a unique key that appears multiple times between tables 1 and 2. The keys 'R&D', 'Product', and 'Admin' are unique keys of the column 'DepartmentName'.

At S440, a hashed fourth table is generated based on the second table and the determined digests. In the example Tables 1 and 2 discussed above, the digests of the unique keys of 'DepartmentName' in both columns yield the same results for the third and fourth tables.

In an optional embodiment, S420 and S440 may further include generating and storing a reverse lookup table in memory in order to be able to translate from the digest back to the original key.

At S450, a JOIN operation is performed between the hashed third table and the hashed fourth table based on a column in each table which has hashed values. In an embodiment, S450 results in generation of a new fifth table. By performing the JOIN operation on the hashed columns, memory space may be saved significantly, leading to cost reduction in memory utilization.

It should be noted that, in some embodiments, a new table does not need to be generated at S450. Instead, a column which includes the digests can be added to an existing table, thereby creating the fifth table by inserting the digests into an existing table. JOIN operations would still be performed based on the digest column, but when retrieving data based on the digest, and data is selected from the hashed column while identifying the row from which to select the data based on the digest.

Figure 5:
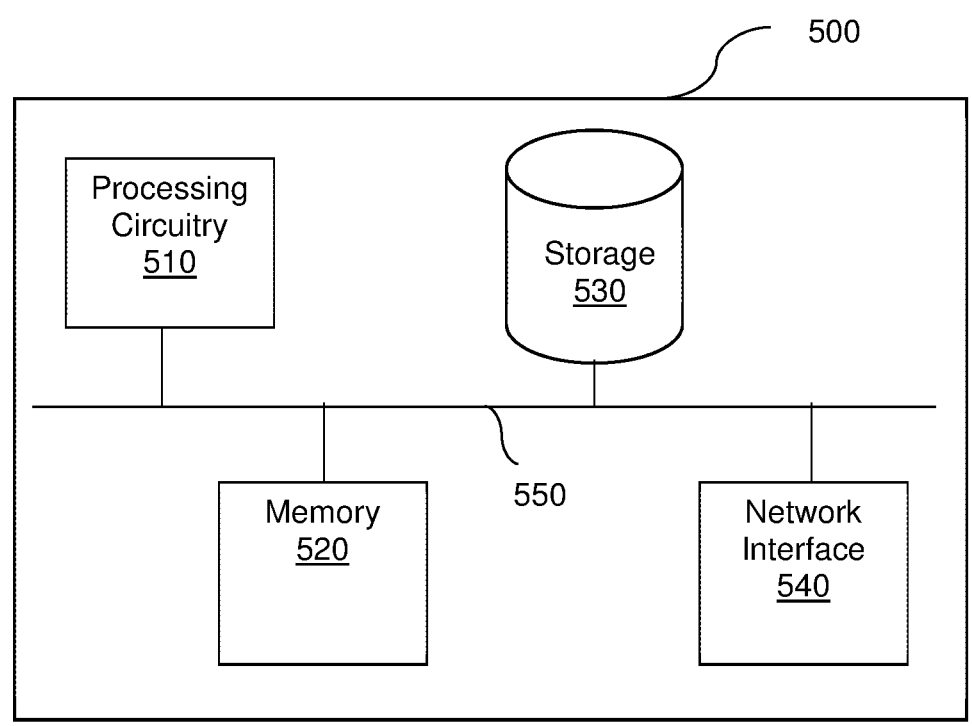
FIG. 5 is a schematic diagram of a system for generating global index values according to an embodiment.

FIG. 5 is an example schematic illustration of a system 500 for generating global index values according to an embodiment. The system 500 includes a processing circuitry 510 coupled to a memory 520, a storage 530, and a network interface 540. In an embodiment, the components of the system 500 may be communicatively connected via a bus 550. The system 500 may be utilized, for example, as a server providing data model services such as, but not limited to, performing JOIN operations in accordance with the disclosed embodiments.

The processing circuitry 510 may be realized as one or more hardware logic components and circuits. For example, and without limitation, illustrative types of hardware logic components that can be used include field programmable gate arrays (FPGAs), application-specific integrated circuits (ASICs), Application-specific standard products (ASSPs), system-on-a-chip systems (SOCs), graphics processing units (GPUs), tensor processing units (TPUs), general-purpose microprocessors, microcontrollers, digital signal processors (DSPs), and the like, or any other hardware logic components that can perform calculations or other manipulations of information.

The memory 520 may be volatile (e.g., RAM, etc.), non-volatile (e.g., ROM, flash memory, etc.), or a combination thereof.

In one configuration, software for implementing one or more embodiments disclosed herein may be stored in the storage 530. In another configuration, the memory 520 is configured to store such software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the processing circuitry 510, cause the processing circuitry 510 to perform the various processes described herein.

The storage 530 may be magnetic storage, optical storage, and the like, and may be realized, for example, as flash memory or other memory technology, CD-ROM, Digital Versatile Disks (DVDs), or any other medium which can be used to store the desired information.

The network interface 540 allows the system 500 to communicate for the purpose of, for example, receiving data, sending data, and the like.

It should be understood that the embodiments described herein are not limited to the specific architecture illustrated in FIG. 5, and other architectures may be equally used without departing from the scope of the disclosed embodiments.

The various embodiments disclosed herein can be implemented as hardware, firmware, software, or any combination thereof. Moreover, the software is preferably implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

All examples and conditional language recited herein are intended for pedagogical purposes to aid the reader in understanding the principles of the disclosed embodiment and the concepts contributed by the inventor to furthering the art, and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

It should be understood that any reference to an element herein using a designation such as "first," "second," and so forth does not generally limit the quantity or order of those elements. Rather, these designations are generally used herein as a convenient method of distinguishing between two or more elements or instances of an element. Thus, a reference to first and second elements does not mean that only two elements may be employed there or that the first element must precede the second element in some manner. Also, unless stated otherwise, a set of elements comprises one or more elements.

As used herein, the phrase "at least one of" followed by a listing of items means that any of the listed items can be utilized individually, or any combination of two or more of the listed items can be utilized. For example, if a system is described as including "at least one of A, B, and C," the system can include A alone; B alone; C alone; 2A; 2B; 2C; 3A; A and B in combination; B and C in combination; A and C in combination; A, B, and C in combination; 2A and C in combination; A, 3B, and 2C in combination; and the like.

What is claimed is:

1. A method for accelerating relational functions between tables, comprising:
   developing a first set of a plurality of first index values by determining an index value for each unique key of a plurality of first unique keys in a first column of a first table;
   developing a second set of a plurality of second index values by determining an index value for each unique key of a plurality of second unique keys in a second column of a second table;
   generating a hashed third table based on the first table by using a replacement of each first unique key in the first column of the first table with a corresponding first index value of the plurality of first index values of the first set, wherein the third table has the same structure as the first table other than the replacement of each first unique key in the first column of the first table with its corresponding one of the first index values of the first set;
   generating a hashed fourth table based on the second table by using a replacement of each second unique key in the second column of the second table with a corresponding second index value of the plurality of second index values of the second set, wherein the fourth table has the same structure as the second table other than the replacement of each second unique key in the second column of the second table with its corresponding one of the second index values of the second set; and generating a fifth table by performing a JOIN operation between the third table and the fourth table based on at least one third column, wherein each of the at least one third column includes a plurality of third unique keys, wherein each third unique key is an index value common between the third table and the fourth table.

2. The method of claim 1, wherein each index value determined for a unique key is determined by inputting the unique key into a hash function.

3. The method of claim 1, further comprising:
storing each unique key in association with its respective corresponding index value in a sixth table.

4. The method of claim 3, wherein one of the plurality of first unique keys is stored with a same corresponding index value as one of the plurality of second unique keys.

5. A non-transitory computer readable medium having stored thereon instructions for causing a processing circuitry to execute a process, the process comprising:

developing a first set of a plurality of first index values by determining an index value for each unique key of a plurality of first unique keys in a first column of a first table;

developing a second set of a plurality of second index values by determining an index value for each unique key of a plurality of second unique keys in a second column of a second table;

generating a hashed third table based on the first table by using a replacement of each first unique key in the first column of the first table with a corresponding first index value of the plurality of first index values of the first set, wherein the third table has the same structure as the first table other than the replacement of each first unique key in the first column of the first table with its corresponding one of the first index values of the first set;

generating a hashed fourth table based on the second table by using a replacement of each second unique key in the second column of the second table with a corresponding second index value of the plurality of second index values of the second set, wherein the fourth table has the same structure as the second table other than the replacement of each second unique key in the second column of the second table with its corresponding one of the second index values of the second set; and generating a fifth table by performing a JOIN operation between the third table and the fourth table based on at least one third column, wherein each of the at least one third column includes a plurality of third unique keys, wherein each third unique key is an index value common between the third table and the fourth table.

6. A system for accelerating relational functions between tables, comprising:
a processing circuitry; and
a memory, the memory containing instructions that, when executed by the processing circuitry, configure the system to:
develop a first set of a plurality of first index values by determining an index value for each unique key of a plurality of first unique keys in a first column of a first table;

develop a second set of a plurality of second index values by determining an index value for each unique key of a plurality of second unique keys in a second column of a second table;

generate a hashed third table based on the first table by using a replacement of each first unique key in the first column of the first table with a corresponding first index value of the plurality of first index values of the first set, wherein the third table has the same structure as the first table other than the replacement of each first unique key in the first column of the first table with its corresponding one of the first index values of the first set;

generate a hashed fourth table based on the second table by using a replacement of each second unique key in the second column of the second table with a corresponding second index value of the plurality of second index values of the second set, wherein the fourth table has the same structure as the second table other than the replacement of each second unique key in the second column of the second table with its corresponding one of the second index values of the second set; and generate a fifth table by performing a JOIN operation between the third table and the fourth table based on at least one third column, wherein each of the at least one third column includes a plurality of third unique keys, wherein each third unique key is an index value common between the third table and the fourth table.

7. The system of claim 6, wherein each index value determined for a unique key is determined by inputting the unique key into a hash function.

8. The system of claim 6, wherein the system is further configured to:
store each unique key in association with its respective corresponding index value in a sixth table.

9. The system of claim 8, wherein one of the plurality of first unique keys is stored with a same corresponding index value as one of the plurality of second unique keys.

10. A method for accelerating relational functions between tables, comprising:
determining an index value from a finite series of values for each unique key of a first plurality of unique keys in a first column of a first table;
determining an index value from the finite series of values for each unique key of a second plurality of unique keys in a second column of a second table;
inserting a hashed column into the first table, wherein the hashed column includes each determined index value in place of its corresponding unique key and otherwise maintaining the structure of the first table.

11. The method of claim 10, wherein each index value determined for a unique key is determined by inputting the unique key into a hash function.

12. The method of claim 10, further comprising:
storing each unique key in association with its respective corresponding index value in a sixth table.

13. The method of claim 12, wherein one of the plurality of first unique keys is stored with a same corresponding index value as one of the plurality of second unique keys.

14. A non-transitory computer readable medium having stored thereon instructions for causing a processing circuitry to execute a process, the process comprising:
determining an index value from a finite series of values for each unique key of a first plurality of unique keys in a first column of a first table;

determining an index value from the finite series of values for each unique key of a second plurality of unique keys in a second column of a second table;

inserting a hashed column into the first table, wherein the hashed column includes each determined index value in place of its corresponding unique key and otherwise maintaining the structure of the first table.

15. A system for accelerating relational functions between tables, comprising:

a processing circuitry; and a memory, the memory containing instructions that, when executed by the processing circuitry, configure the system to:

determine an index value from a finite series of values for each unique key of a first plurality of unique keys in a first column of a first table;

determine an index value from the finite series of values for each unique key of a second plurality of unique keys in a second column of a second table;

insert a hashed column into the first table, wherein the hashed column includes each determined index value in place of its corresponding unique key and otherwise maintaining the structure of the first table.

16. The system of claim 15, wherein each index value determined for a unique key is determined by inputting the unique key into a hash function.

17. The system of claim 15, wherein the system is further configured to:

storing each unique key in association with its respective corresponding index value in a sixth table.

18. The system of claim 17, wherein one of the plurality of first unique keys is stored with a same corresponding index value as one of the plurality of second unique keys.

* * * * *